United States Patent [19]

Honda

[11] Patent Number: 4,461,366
[45] Date of Patent: Jul. 24, 1984

[54] FRAME FOR MOTORCYCLES

[75] Inventor: Kazuo Honda, Yokohama, Japan

[73] Assignee: Honda Motor Co., Ltd., Tokyo, Japan

[21] Appl. No.: 418,646

[22] Filed: Sep. 16, 1982

[30] Foreign Application Priority Data

Sep. 18, 1981 [JP] Japan ................... 56-148264
Sep. 19, 1981 [JP] Japan ............... 56-139436[U]
Feb. 1, 1982 [JP] Japan ................... 57-15313

[51] Int. Cl.³ .................. B62K 11/04; B62M 7/02
[52] U.S. Cl. ........................... 180/229; 165/41; 403/380
[58] Field of Search ............... 180/229, 225, 229, 219, 180/68.4; 165/41; 123/195 R; 403/339, 393, 388, 380

[56] References Cited

U.S. PATENT DOCUMENTS

| 479,706 | 7/1892 | Dexter | 403/380 |
| 1,339,387 | 5/1920 | Hammond | 180/229 X |
| 2,408,907 | 10/1946 | Booth | 403/380 |
| 3,941,492 | 3/1976 | Meinunger | 403/380 X |
| 4,016,945 | 4/1977 | Shibata | 180/229 |

FOREIGN PATENT DOCUMENTS 2607154 9/1977 Fed. Rep. of Germany ...... 403/388

Primary Examiner—John A. Pekar
Attorney, Agent, or Firm—Arthur L. Lessler

[57] ABSTRACT

In a motorcycle equipped with a water-cooled engine, part of the frame, on which the engine is supported, is used as a passage for engine cooling water. The above part of the frame may be formed of a hollow tubular member which can be separated from the frame body. The hollow tubular member may be disjoinably joined to the frame body by coupling means utilizing engagement of a pair of a protuberance and a recess or engagement of a pair of a convex surface and a concave surface.

16 Claims, 15 Drawing Figures

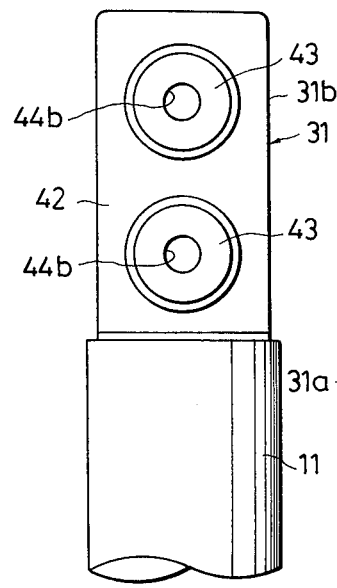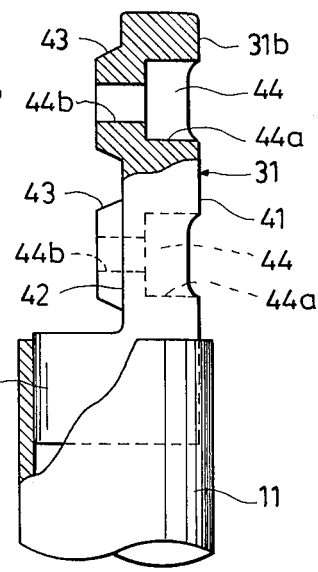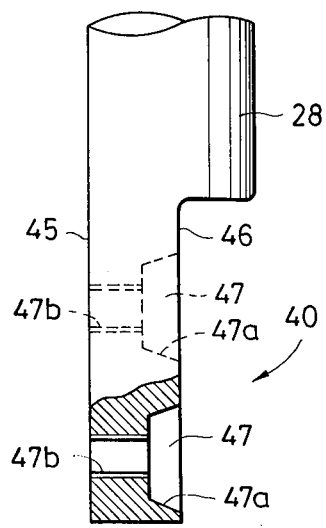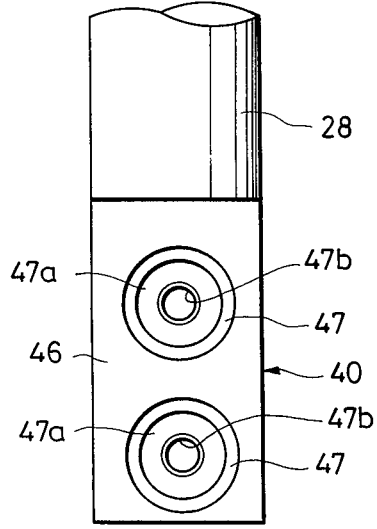

FRAME FOR MOTORCYCLES

BACKGROUND OF THE INVENTION

This invention relates to a frame for motorcycles, and more particularly to a frame for motorcycles equipped with water-cooled engines.

Conventionally, in a motorcycle equipped with a water-cooled engine, the engine is supportedly mounted on a pair of left and right down tubes extending substantially vertically downward from a front portion of the main frame and then extending rearwardly of the motorcycle, and a radiator for cooling engine cooling water is supportedly mounted on the vertically downwardly extending portion of the down tubes. It is hard to mount the engine and many parts related to the engine into a small space defined between the main frame and the down tubes. To facilitate the operation of mounting and dismounting the engine, etc. into and out of the above space, a frame has been proposed in which one of the left and right down tubes is separable from the main frame.

However, in motorcycles equipped with water-cooled engines, it is widely employed to connect the radiator, the engine and a cooling water pump in a direct manner by means of india-rubber hoses or the like. The operation of laying the hoses in the narrow space enclosed by the main frame and the down tubes is troublesome and painful, which still makes harder the operation of mounting the engine, the radiator, etc. onto the frame, even with the above-mentioned separable down tube. Furthermore, the connection of the radiator, the engine and the water pump requires a considerable number of mounting parts.

Moreover, the above separable frame member should have sufficient structural strength enough to withstand use as a component member of the support frame of the motorcycle. Particularly, the joints between the separable frame member and the main frame should be sufficiently firm to obtain sufficient structural strength of the overall frame.

OBJECTS OF THE INVENTION

It is an object of the invention to provide a frame for use in a motorcycle, which is used in part as a passage for engine cooling water, to thereby facilitate mounting of the radiator and the engine onto the frame, as well as to reduce the number of parts for mounting the radiator onto the frame.

It is a further object of the invention to provide a frame for use in a motorcycle, which is formed in part by a separable hollow tubular member for use as a passage for engine cooling water, and which is also provided with couplings for firmly joining the tubular member to the frame body.

It is another object of the invention to provide a frame for use in a motorcycle, which is provided with couplings for joining the separable hollow tubular member to the frame body, which can be fabricated with ease and afford simple coupling operation.

The above and other objects, features and advantages of the invention will be more apparent from the ensuing detailed description taken in connection with the accompanying drawings.

BRIEF DESCRIPTION OF THE DRAWINGS

FIG. 5 is a front view, on an enlarged scale, of a coupling element provided on the down tube;

FIG. 6 is a side view, on an enlarged scale, of the coupling element of FIG. 5;

FIG. 7 is a side view, on an enlarged scale, of a coupling element provided on the frame body;

FIG. 8 is a front view, on an enlarged scale, of the coupling element of FIG. 7;

DETAILED DESCRIPTION

The invention will now be described in detail with reference to the drawings showing preferred embodiments of the invention.

Figure 1:
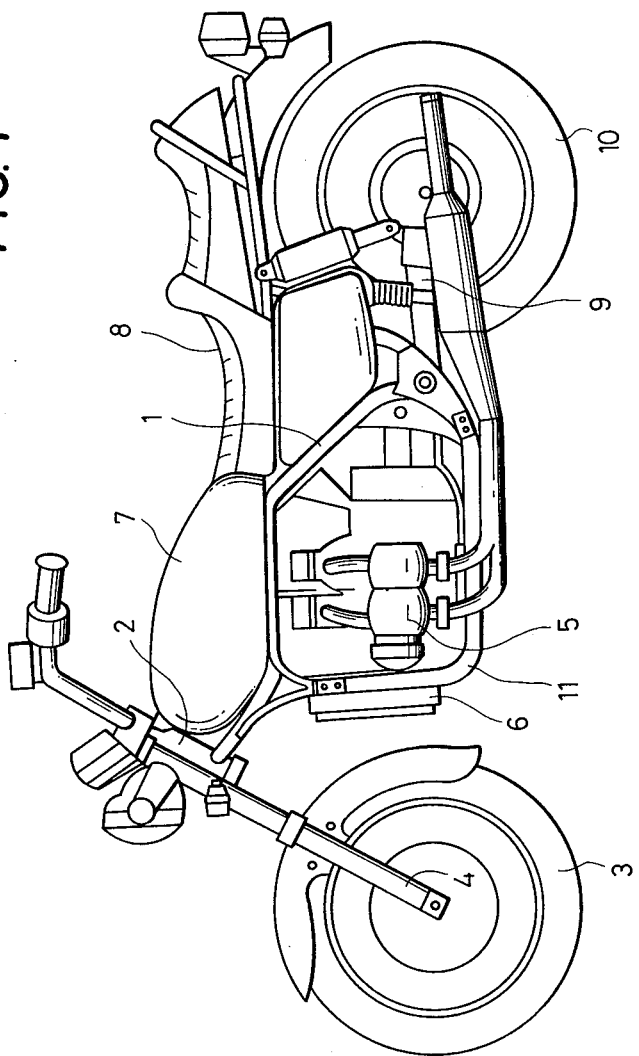
FIG. 1 is a shematic side view of a motorcycle which is provided with a frame according to the present invention.

Referring first to FIG. 1, a motorcycle is shown, by way of example, to which is applied a frame according to the present invention. Reference numeral 1 designates a frame body which is formed by a plurality of pipes integrally joined together, and serves as a support structure for the motorcycle. The frame body 1 steerably supports at its front fork 4 which supports a front wheel 3 through a head tube 2, and also carries a water-cooled engine 5 supported on its substantially central lower portion. A radiator 6 is mounted on a front vertical portion of the frame body 1, for cooling engine cooling water. A fuel tank 7 is mounted on an upper portion of the same frame body 1, with a seat 8 supported on a portion of the frame body rearwardly adjacent the fuel tank 7. Joined to a rear lower portion of the frame body 1 is a rear fork 9 which supports at its rear end a rear wheel 10. The radiator 6 and the engine 5 are connected to each other by passageways forming a circuit for the engine cooling water in cooperation with the radiator 6 and the engine 5.

The frame body 1 has its lower part formed by a pair of left and right down tubes, left one 11 of which is illustrated. In this embodiment, the illustrated down tube 11 is formed of a separate piece as a separable frame member for facilitation of the operation of mounting the engine 5 and its peripheral parts onto the frame body 1. The separable down tube 11 has its opposite ends closed by respective coupling elements, hereinlater referred to, for joining the tube 11 to the frame body 1. The down tube 11 has its hollow interior used as a passage for feeding engine cooling water, which has been cooled by the radiator 6, from the radiator 6 to the engine 5, the passage forming part of the above-mentioned engine cooling water circuit.

Figure 2:
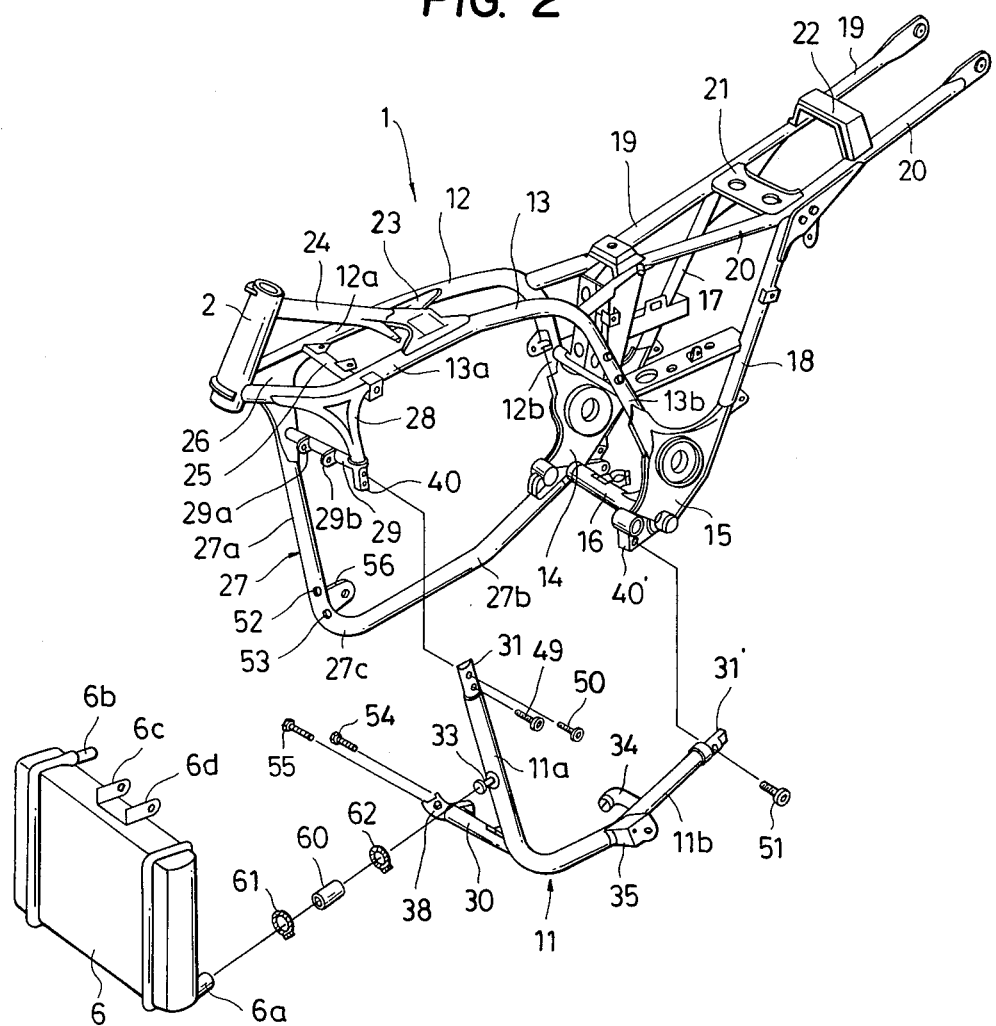
FIG. 2 is an exploded perspective view of a frame according to an embodiment of the present invention.

The frame body 1 has a construction as shown in detail in FIG. 2. Its upper part is formed by a pair of arcuate main frame members 12 and 13 forming the main frame and axially rearwardly extending from a lower end of the head tube 2 and substantially parallel with each other. The main frame members 12 and 13 have front portions 12a and 13a substantially horizontally disposed and rear portions 12b and 13b rearwardly downwardly extending from the front portions 12a and 13a. Joined to lower ends of the rear portions 12b and 13b are upper front ends of gusset plates 14 and 15, each having an inverted triangular shape, between which a cross member 16 is bridged and joined thereto. The gusset plates 14 and 15 are joined at their upper rear ends to lower ends of rear stays 17 and 18 rearwardly upwardly extending therefrom. Joined to rear upper ends of the rear portions 12b and 13b of the main frame members 12 and 13 are a pair of rear members 19 and 20 which rearwardly extend and have their intermediate portions joined to upper ends of the rear stays 17 and 18, with a cross member 21 bridged between the joints. A support member 22 is bridged between the rear stays 17 and 18 at a location rearward of the cross member 21, for supporting a rear portion of the seat 8 and a rear fender. A support member 23 is bridged between the front portions 12a and 13a of the main frame members 12 and 13 at their intermediate locations and a backbone member 24 is axially obliquely bridged between the support member 23 and an upper end of the head tube 2. A cross member 25 is bridged between the main frame members 12 and 13 at a location frontward of the support member 23.

A generally L-shaped down tube 27 is joined to one of the left and right main frame members 12 and 13, e.g. the right member 13, at its front end by means of a downwardly pending mounting member 26. The down tube 27 comprises a front portion 27a vertically downwardly extending from the mounting member 26 and a rear portion 27b horizontally rearwardly extending from a central portion 27c at a lower end of the front portion 27a. An upper end of the front portion 27a is joined to the mounting member 26, and a rear end of the rear portion 27b to a lower portion of the gusset plate 14, respectively.

Joined to a front end of the front portion 13a of the left main frame member 13 is another downwardly pending mounting member 28 in an arrangement symmetrical with the right mounting member 26, on which the down tube 11 is to be mounted. A cross member 29 is bridged between the two mounting members 26 and 28, which is formed with fitting flanges 29a and 29b for mounting the radiator 6 onto the down tubes 11 and 27.

Figure 3:
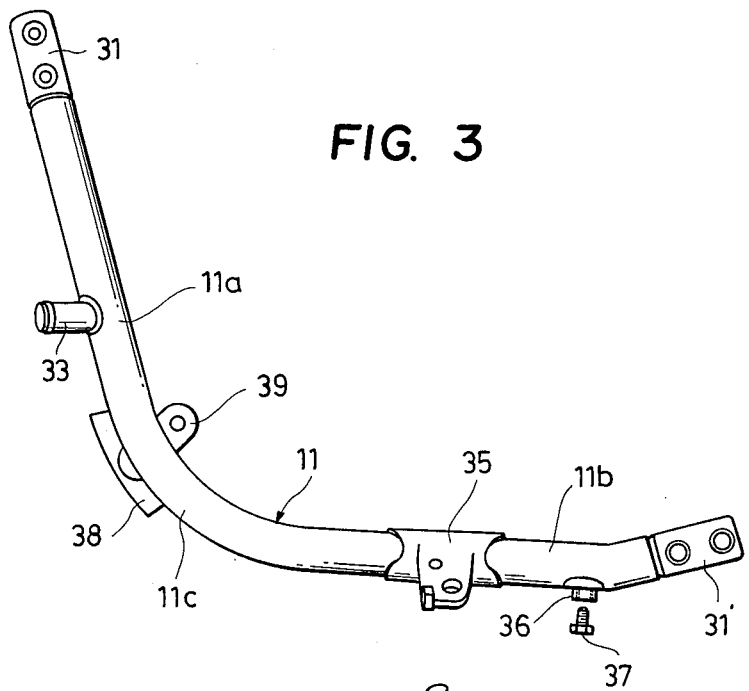
FIG. 3 is a side view of a separable down tube applicable to the frame of the present invention.
Figure 4:
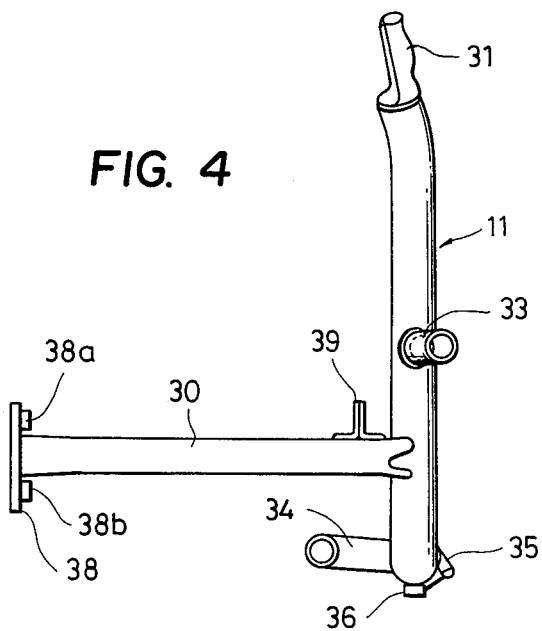
FIG. 4 is a front view of the down tube of FIG. 3.

As illustrated in detail in FIGS. 3 and 4, the left down tube 11, which forms a separable frame member, has a generally L-shaped configuration corresponding to the right down tube 27 and comprises a vertically extending front portion 11a, and a rear portion 11b horizontally rearwardly extending from a central portion 11c at a rear end of the portion 11a. Joined to the down tube 11 is a cross member 30 which horizontally inwardly extends from an inside surface of the folded central portion 11c of the down tube 11. This cross member 30 is to be joined to the folded central portion 27c of the right down tube 27 in joining the down tube 11 to the main frame. The separable down tube 11 has its hollow interior used as an engine cooling water passage connecting between the radiator 6 and the engine 5. In the illustrated embodiment, it is used as a passage for feeding engine cooling water from the radiator 6 to the engine 5. The down tube 11 is joined at its front upper end to a lower end of the mounting member 28, and at its rear lower end to a lower end of the gusset plate 15. To this end, the down tube 11 has its opposite ends provided with coupling elements 31 and 31', hereinlater referred to, which are adapted for respective engagement with coupling elements 40 and 40' of the mounting members 28 and 15 on the main frame side. A cooling water inlet connector 33 having an inlet port formed therein is provided on the front portion 11a of the down tube 11, with its open end directed frontward but slightly obliquely. An L-shaped cooling water outlet connector 34 having an outlet port formed therein is provided on the rear portion 11b at its intermediate location, with its open end directed frontward. A bracket 35 is fitted on the down tube 11 at a location slightly frontward of the outlet connector 33, for mounting a side stand, not shown, onto the down tube 11, and a drain port 36 is provided on the same tube 11 at a lowermost location slightly rearward of the outlet connector 34. The drain port 36, which can be closed by a plug 37, serves to drain cooling water present in the down tube 11, etc. from the tube 11, when opened according to necessity. The cross member 30 has its tip formed with a fitting flange 38 and carries another fitting flange 39 secured thereto at a location close to its root end for mounting the engine 5 onto the down tube 11.

Referring next to FIGS. 5 and 6, there is illustrated in detail the coupling element 31 provided on the front upper end of the down tube 11.

The coupling element 31 is formed by means of forging, for instance, and comprises a solid cylindrical base 31a which is to be fitted in the front upper end of the down tube 11, and a semicylindrical main body having a substantially semicircular cross section and axially extending integrally from an end of the base 31a. The solid cylindrical base 31a has an outside diameter almost equal to the inside diameter of the down tube 2, and fitted in the end of the tube 2 and secured thereto by means of welding or brazing. The main body 31a is disposed eccentrically with respect to the base 31a, and has a side surface 41 located on substantially the same plane with the outer peripheral surface of the base 31a, and the opposite side surface 42 having flatness over the whole axial length of the main body and located at a substantially diametric center in the end face of the base 31a. The flat side surface 42 is formed integrally with two engaging radial protuberances 43 and 43, each in the form of a truncated cone, which are arranged along the longitudinal axis and axially spaced from each other. The protuberances 43 and 43 are each formed with a radial through hole 44 extending therethrough along its axis, through which a fastening bolt, not shown, is to be fitted. Each through hole 44 comprises an enlarged portion 44a opening in the semicircular outer side surface 41 and in which the head of the fastening bolt is to be received, and a narrowed portion 44b continuous with the enlarged portion 44a and opening in the flat inner side surface 42, through which the fastening bolt is to be fitted.

FIGS. 7 and 8 illustrate details of the coupling element 40, which, in this embodiment, is formed integrally on the lower end of the mounting member 28 on the main frame side and adapted for mating engagement with the coupling element 31 appearing in FIGS. 5 and 6. The coupling element 40 can be formed by means of forging in a manner similar to the coupling element 31 of the down tube 11 and has a substantially identical semicylindrical configuration with the coupling element 31. It has a main body axially extending integrally from the cylindrical lower end of the mounting member 28 which substantially forms the base of the coupling element, and disposed in eccentricity therewith. The main body has an outer semicircular side surface 45 located on substantially the same plane with the outer peripheral surface of the lower end of the mounting member 28, and the opposite or inner side surface 46 having flatness over the whole axial length of the main body for close contact with the flat inner side surface 42 of the coupling element 31. The inner side surface 46 is located at a substantially diametric center in the lower end face of the mounting member 28, and formed with two engaging radial through holes 47 and 47 arranged along its longitudinal axis and axially spaced from the each other. The through holes 47 and 47 are located at corresponding locations to the through holes 44 and 44 of the coupling element 31. Each engaging through hole 47 has an enlarged portion 47a in the form of an inverted truncated cone, opening in the flat inner side surface 46 and in which a corresponding one of the engaging protuberances 43 of the coupling element 31 is to be fitted, and a threaded portion 47b continuous with the enlarged portion 47a and opening in the semicircular side surface 45 and in which the threaded portion of the aforementioned fastening bolt is to be screwed.

In the embodiment illustrated in FIGS. 2 through 8, the coupling element 31' at the rear end of the down tube 11 is adapted for mating engagement with the coupling element 40' at the lower end of the left gusset plate 15. In the illustrated embodiment, these coupling elements 31' and 40' are substantially identical in construction with the above described coupling elements 31 and 40, except that the former coupling elements each have only one engaging protuberance and engaging through hole corresponding to the ones 43 and 47 in the latter coupling elements, description of which is, therefore, omitted here.

Figure 9:
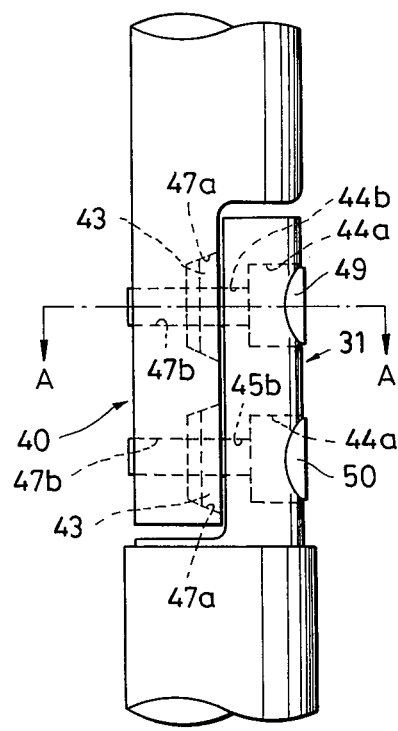
FIG. 9 is a side view of the coupling element in FIGS. 5 and 6 and the one in FIGS. 7 and 8 in a coupled state.
Figure 10:
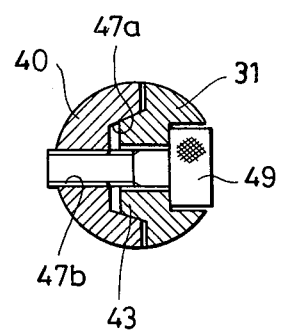
FIG. 10 is a sectional view taken along line A—A in FIG. 9.

The manner of mounting the down tube 11 onto the main frame will now be described with reference to FIGS. 2, 9 and 10. The engine 5, shown in FIG. 1, is placed onto the cross member 30 and the down tube 11, and secured to the cross member 30 by fastening the engine 5 at its fitting flange 39, shown in FIGS. 3 and 4, to the cross member 30 by means of a bolt and a nut, not shown, or the like. Then, the coupling elements 31 and 31' at the opposite ends of the down tube 11 are coupled, respectively, to the coupling element 40 on the left mounting member 28 secured to the main frame member 13 and to the coupling element 40' on the left gusset plate 15 secured to the same member 13. More specifically, as shown in detail in FIGS. 9 and 10, first, the two engaging protuberances 43 and 43 of the coupling element 31 of the down tube 11 are mated with the engaging through holes or recesses 47a and 47a, with the flat side surfaces 42 and 46 of the two coupling elements in close contact with each other, followed by fitting two bolts 49 and 50 through the through holes 44 and 44 of the coupling element 31 into threaded engagement with the threaded holes 47b and 47b of the coupling element 40 which are then in alignment with the former holes 44 and 44. Thus, the two coupling elements 31 and 40 are coupled and fastened together by means of the bolts 49 and 50. On the other hand, the coupling between the coupling element 31' at the other or opposite end of the down tube 11 and the one 40' at the gusset plate 15 is effected in a manner similar to the above described manner, by the use of a bolt 51 similar to the bolts 49 and 50. Then, the fitting flange 38 of the cross member 30 is coupled to the right down tube 27 and fastened thereto by fitting bolts 54 and 55 through threaded holes 52 and 53 formed in the down tube 27 in the vicinity of the folded central portion 27c and corresponding holes 38a and 38b formed in the flange 38. On this occasion, the engine 5 becomes also supported on the rear portion 27b of the down tube 27. Thereafter, the right half of the engine 5 is secured to the right down tube 27 at its fitting flange 56 in the vicinity of the folded central portion 27c of the tube 27 by means of a bolt and a nut, not shown, thus completely mounting the engine 5 onto the left and right down tubes 27 and 11 in a manner supported on the tubes 27 and 11.

Next, the radiator 6 is mounted onto the cross member 29 bridged between the left and right mounting members 26 and 28, by engaging fitting flanges 6c and 6d, shown in FIG. 2, provided on the radiator 6 with the fitting flanges 29a and 29b on the cross member 29 and fastening the two members 6 and 29 together at the flanges by means of bolts or the like, not shown. Then, the cooling water outlet connector 6a, shown in FIG. 2, of the radiator 6 is connected to the cooling water inlet connector 33 of the down tube 11 by means of a flexible tube 60, formed of rubber or the like, by clamping the opposite ends of the tube 60 fitted on the respective connectors by means of clamps 61 and 62. The cooling water outlet connector 34 of the down tube 11 is connected to a cooling water pump, not shown, and the cooling water inlet connector 6b, shown in FIG. 2, of the radiator 6 is connected to the water jacket, not shown, of the engine 5 by means of a tubular member, not shown. Thus, cooling water can be supplied from the down tube 11 to the water jacket of the engine 5 through the water pump, while cooling water can be returned from the engine 5 to the inlet connector 6b of the radiator 6 through the tubular member.

After the down tube 11 has thus been coupled to the main frame by means of the coupling elements 31, 40, 31' and 40' constructed above, loads applied to the joints of the down tube 11 and the main frame are equally borne by the bolts 49-51 and the engaging protuberances of the coupling elements 31 and 32. More specifically, almost all of the shearing force component of force applied to each joint acts upon the engaging protuberance or protuberances, while the tensile force component acts upon the bolt or bolts. Thus, the joints have sufficient structural strength.

Further, when the engaging protuberances 43 and 43 of the coupling element 31, for instance, are mated with the engaging holes 47a and 47a of the corresponding coupling element 40, the smaller holes 44b and 44b of the coupling element 31 are automatically aligned with the corresponding threaded holes 47b and 47b of the coupling element 40, which facilitates the positioning of the coupling elements relative to each other. A similar effect to the above can be obtained with the coupling of the coupling elements 31' and 40', as well.

The number of the engaging protuberances 43 is not limited to two, but may be increased or decreased to another number, if required. Also, all or part of the engaging protuberances of the coupling elements 31 and 31' of the down tube 11 may be provided on the coupling elements 40 and 40' on the main frame side.

Figure 11:
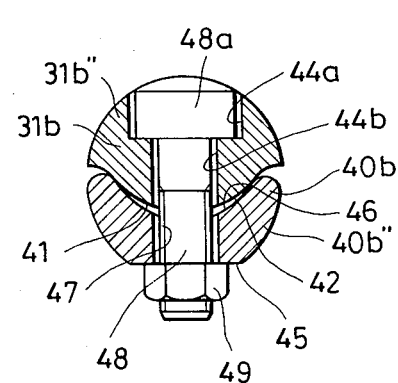
FIG. 11 is a cross-sectional view of another embodiment of the coupling.
Figure 12:
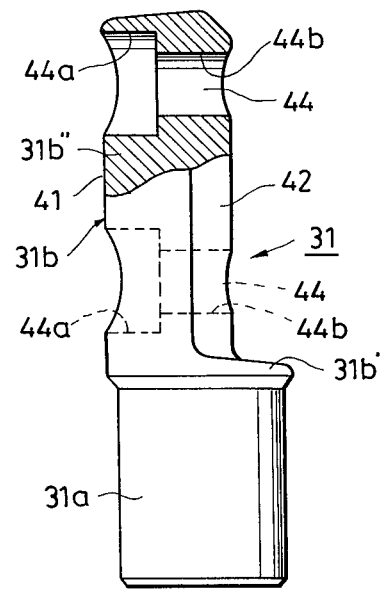
FIG. 12 is a side view, partly broken away, of one of the coupling elements in FIG. 11.
Figure 13:
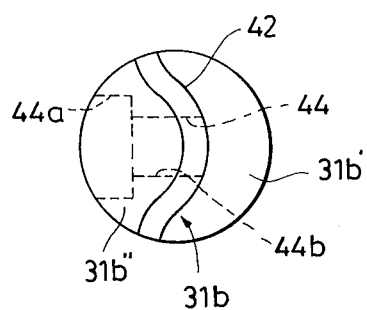
FIG. 13 is an end view of the coupling element of FIG. 12.

Referring next to FIGS. 11 through 15, another embodiment of the coupling elements of the down tube 11 and the mounting member 28 is illustrated. In the present embodiment, parts corresponding to those in the preceding embodiment are designated by identical reference numerals. Referring first to FIGS. 12 and 13, a coupling element 31 is illustrated, which is to be mounted on the front upper end of the down tube 11. This coupling element 31 can also be formed of a forging. Its base 31a, which has a solid cylindrical configuration similar to that in the preceding embodiment, is formed integrally with a main body 31b which is larger in diameter than the base 31a. The main body 31b has an enlarged portion 31b' located adjacent the base 31a, having a circular cross section and radially outwardly bulged along its whole periphery, and an axial portion 31b" axially extending from the enlarged portion 31b' in eccentricity therewith. The axial portion 31b" has an inner side surface 42 having a convex profile with a semicircular cross section, extending along its whole axial length. The axial portion 31b" is formed with radial through holes 44 and 44 arranged along its longitudinal axis in relation spaced from each other, in a manner similar to the main body 31b of the coupling element 31 shown in FIGS. 5 and 6. Each of the radial through holes 44 and 44 comprises an enlarged portion 44a opening in a semicircular outer side surface 41 and an narrowed portion 44b continuous with the enlarged portion 44a opening in the inner side surface 42.

Figure 14:
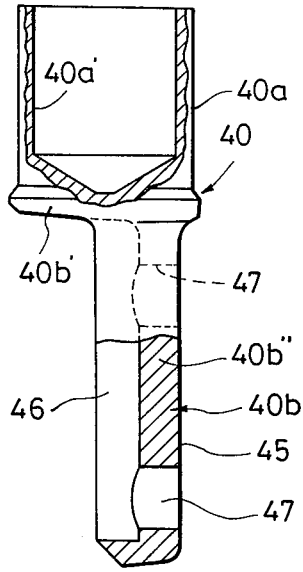
FIG. 14 is a side view, partly broken away, of the other of the coupling elements in FIG. 11.
Figure 15:
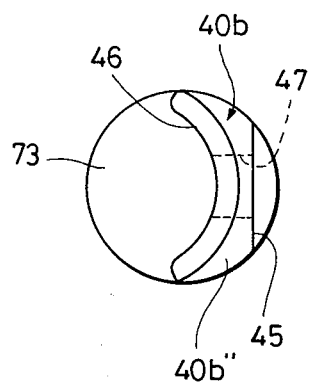
FIG. 15 is an end view of the coupling element of FIG. 14.

FIGS. 14 and 15 illustrate a coupling element 40 provided on the mounting member 28 on the main frame side, and adapted for mating engagement with the coupling element 31 of FIGS. 12 and 13. This coupling element 40, which can also be formed of a forging, has its upper base 40a formed in its end face with a blind hole 40a' in which the lower portion of the mounting member 28 is to be fitted and secured thereto by welding or the like. A main body 40b axially extends integrally from the base 40a in eccentricity therewith. The main body 40b comprises an enlarged portion 40b' located adjacent the base 40a and radially outwardly bulged along its whole periphery with a circular cross section, and an axial portion 40b" axially extending from the enlarged portion 40b' in eccentricity therewith. The axial portion 40b" has an inner side surface 46 having a concave profile with a semicircular cross section, extending along its whole axial length. An opposite or outer side surface 45 presents a flat cut surface along its whole axial length. The axial portion 40b" is formed with radial through holes 47 and 47 arranged along its longitudinal axis in relation spaced from each other and opening in the both side surfaces 45 and 46. These radial through holes 47 and 47 are located at corresponding locations to the through holes 44 and 44 of the coupling element 31.

The above convex side surface 42 of the coupling element 31 in FIGS. 12 and 13 has a radius of curvature larger than that of the concave side surface 46 of the coupling element 40 in FIGS. 14 and 15.

The manner of coupling the coupling elements 31 and 40 together will now be described with particular reference to FIG. 11. The convex side surface 42 of the coupling element 31 is brought into contact with the concave side surface 46 of the coupling element 40 in axial alignment. Two bolts 48 and 48, one of which is shown, are inserted through the through holes 44 and 44 in the coupling element 31 and then through the through holes 47 and 47 in the coupling element 40 in such a manner that the head 48a of each bolt 48 is wholly received within the enlarged portion 44a of the corresponding through hole 44, with a threaded end portion of the bolt 48 outwardly projected from the cut side surface 45 of the coupling element 40. A nut 49 is threadedly fitted onto the projected threaded end portion of the bolt 48 to fasten the two coupling elements 31 and 40 together in a manner urging the convex side surface 42 and the concave side surface 46 against each other. The through holes 44 and 47 have superfluously large diameters enough for the bolts 48 to play in the holes 44 and 47.

The same structure as described above with reference to FIGS. 11 through 15 can be applied to the coupling elements 31' of the rear end of the down tube 11 and the coupling element 40' of the gusset plate 15.

According to the coupling shown in FIGS. 11 through 15, the side surfaces 42 and 46 engaging each other have semicircular profiles, which permit free relative circumferential or angular displacement of the couplings 31 and 40. As a consequence, the coupling elements can be easily brought into tight engagement with each other, even with a deviation of either of the main frame and the down tube from its proper position. This permits machining the engaging holes 44 and 47 with rather low machining tolerances. Further, the side surfaces 42 and 46 being also flat in the axial direction, the axial relative positions of the coupling elements 31, 40 can be adjusted. Therefore, the machining tolerances and location tolerances of the main frame members and the location tolerances of the engine can be absorbed by the couplings of the separable frame member, facilitating the manufacture and mounting of the main frame and the engine. Furthermore, since the convex side surface 42 has a larger radius of curvature than the concave side surface 46, a gap is produced between the two engaging side surfaces, which enables to obtain firm joining of the separable frame member with the main frame by means of bolts 48 and nuts 49 and also prevents easy loosening of the bolts and nuts, due to the elastic force of the engaging coupling elements. In addition, the coupling elements are simple in construction.

In a manner reverse to the illustrated embodiment, the side surface 42 of the coupling element 31 may be concave, and the side surface 46 of the coupling element 46 convex, respectively, providing similar excellent results to those stated above.

Although the invention has been applied to a motorcycle in the foregoing embodiments, it may be applied to motor tricycles having similar frames to the described frame of the motorcycle. Moreover, the separable frame member may be applied to any other portion of the frame than the down tube 11. Also, the separable down tube 11 may be used as a passage for returning water used for cooling the engine, from the engine to the radiator.

What is claimed is:

1. In a motorcycle including a water-cooled engine, a radiator operable to cool water for cooling said engine, passage means connecting said engine with said radiator and forming a circuit for said cooling water in cooperation with said engine and said radiator, and a frame on which said engine and said radiator are supportedly mounted, the improvement wherein said frame comprises: at least one axially extending main frame member forming an upper part of said frame, said main frame member having a substantially horizontally extending front portion and a rear portion extending rearwardly from said front portion; and at least one separable hollow tubular member forming a lower part of said frame and having (i) a front portion joined to said front portion of said main frame member and extending substantially vertically downwardly therefrom and (ii) a rear portion substantially horizontally rearwardly extending from said front portion thereof and joined to said rear portion of said main frame member, said hollow tubular member being separable from said main frame member, the interior of said hollow tubular member forming part of said circuit for said cooling water; and coupling means for disjoinably joining said separable hollow tubular member to said main frame member.

2. The motorcycle as claimed in claim 1, wherein said part of said circuit for said cooling water is used for feeding said cooling water from said radiator to said engine.

3. The motorcycle as claimed in claim 1 or 2, wherein said hollow tubular member has a lowermost portion thereof provided with a port for draining said cooling water therefrom.

4. The motorcycle as claimed in claim 1, wherein said separable hollow tubular member has opposite ends, said main frame member having two ends, each of said opposite ends of said separable hollow tubular member being disjoinably joined to a corresponding end of said main frame member, said coupling means comprising: a first coupling element provided on one end of said separable hollow tubular member and a corresponding end of said main frame member and having a first engaging surface and at least one protuberance formed on said first engaging surface; a second coupling element provided on the other end of said separable hollow tubular member and a corresponding end of said main frame member, said second coupling element having a second engaging surface for engagement with said first engaging surface of said first coupling element, and a recess opening in said second engaging surface and adapted to receive said protuberance of said first coupling element; and means for fastening said first and second coupling elements together, whereby said first and second coupling elements are fastened together by said fastening means in a manner such that said first and second engaging surfaces of said first and second coupling elements are engaged with each other with said protuberance fitted in said recess.

5. The motorcycle as claimed in claim 4, wherein said protuberance of said first coupling element has the shape of an inverted truncated cone corresponding to the shape of said protuberance.

6. The motorcycle as claimed in claim 4, wherein said protuberance of said first coupling element has a first radial through hole extending along an axis thereof and opening in said first engaging surface, said second coupling element has a threaded hole formed therein continuously with said recess thereof to form a second radial through hole in cooperation with said recess, and said means for fastening said first and second coupling elements together comprises a bolt inserted through said first radial through hole in said protuberance and said recess in said second coupling element and threadedly engaged in said threaded hole in said second coupling element.

7. The motorcycle as claimed in claim 6, wherein said bolt has a head, and said first through hole in said protuberance includes an enlarged portion opening in a side surface of said first coupling element opposite to said first engaging surface, said enlarged portion of said first through hole being adapted to receive said head of said bolt.

8. The motorcycle as claimed in any one of claims 4 through 7, wherein said first and second coupling elements each comprises a base and a main body axially extending from said base in eccentricity therewith, said base being formed on a corresponding end of said separable hollow tubular member and the corresponding end of said main frame member, said main body having an inner side surface forming a corresponding one of said first and second engaging surfaces.

9. The motorcycle as claimed in claim 1, wherein said separable hollow tubular member has opposite ends, said corresponding main frame member having two ends, each of said opposite ends of said separable hollow tubular member being disjoinably joined to a corresponding end of said main frame member; said coupling means comprising: a first solid coupling element provided on one end of said separable hollow tubular member and a corresponding end of said main frame member, said first coupling element having an engaging convex surface having a substantially semicircular cross section; a second solid coupling element provided on the other end of said separable hollow tubular member and the corresponding end of said corresponding main frame member, said coupling element having an engaging concave surface having a substantially semicircular cross section, said engaging convex surface having a radius of curvature larger than said engaging concave surface; and means for fastening said first and second coupling elements together, whereby said first and second coupling elements are fastened together by said fastening means in a manner such that said engaging convex surface and said engaging concave surface are in urging contact with each other.

10. The motorcycle as claimed in claim 9, wherein said first coupling element has at least one first radial through hole opening in said engaging convex surface, said second coupling element has at least one second radial through hole corresponding in number to said first radial through hole and opening in said engaging concave surface at a location corresponding to said first radial through hole, and said fastening means comprises a bolt extending through said first radial through hole and said second radial through hole corresponding thereto, and a nut threadedly fitted on an and portion of said bolt.

11. The motorcycle as claimed in claim 10, wherein said first and second radial through holes are larger in diameter than a portion of said bolt inserted therein, for allowing said bolt to play therein.

12. The motorcycle as claimed in claim 10 or 11, wherein said bolt has a head, and said first radial through hole in said first coupling element has an enlarged portion opening in a side surface of said first coupling element opposite to said engaging convex surface thereof, for recieving said head of said bolt.

13. The motorcycle as claimed in any one of claims 9 through 11, wherein said first and second coupling elements each comprises a base and a main body axially extending from said base in eccentricity therewith, said base being formed on a corresponding end of said separable hollow tubular member and the corresponding end of said main frame member, said main body having an inner side surface forming a corresponding one of said engaging convex surface and said engaging concave surface.

14. In a motorcycle including a water-cooled engine, a radiator operable to cool water for cooling said engine, passage means connecting said engine with said radiator and forming a circuit for said cooling water in cooperation with said engine and said radiator, and a frame on which said engine and said radiator are supportedly mounted, the improvement wherein said frame comprises:

a pair of main frame members forming an upper part of said frame and axially extending substantially parallel with each other, each main frame member having a substantially horizontally extending front portion and a rear portion extending rearwardly from said front portion;

a pair of down tubes forming a lower part of said frame, each down tube having (i) a front portion joined to said front portion of a corresponding one of said main frame members and extending substantially vertically downwardly therefrom and (ii) a rear portion substantially horizontally rearwardly extending from said front portion thereof and joined to the rear portion of the corresponding main frame member, at least one of said down tubes forming a hollow tubular member and being separable from a corresponding one of said main frame members; and coupling means for disjoinably joining said hollow tubular member to said frame, said hollow tubular member having an interior thereof forming part of said circuit for said cooling water.

15. The motorcycle as claimed in claim 14, wherein said radiator is mounted on said front portions of said down tubes and has an inlet port for said cooling water and an outlet port for same, said engine is mounted on said rear portions of said down tubes and connected to said cooling water inlet port of said radiator, and said at least one down tube has an interior thereof formed as a passage for feeding said cooling water from said radiator to said engine, said front portion of said at least one down tube having an inlet port for said cooling water, for connection to said outlet port of said radiator, and said rear portion of said at least one down tube having an outlet port for said cooling water, for connection to said engine.

16. The motorcycle as claimed in claim 14, wherein said hollow tubular member has a lowermost portion thereof provided with a port for draining said cooling water therefrom.

* * * * *